(12) United States Patent
Lee et al.

(10) Patent No.: US 8,072,962 B2
(45) Date of Patent: Dec. 6, 2011

(54) METHOD OF DETECTING AND SOLVING NETWORK ID CONFLICT

(75) Inventors: Myung-jong Lee, New York, NY (US); Yong Liu, New York, NY (US)

(73) Assignees: Samsung Electronics Co., Ltd., Suwon-si (KR); City University of New York, New York, NY (US)

( * ) Notice: Subject to any disclaimer, the term of this patent is extended or adjusted under 35 U.S.C. 154(b) by 956 days.

(21) Appl. No.: 11/546,239

(22) Filed: Oct. 12, 2006

(65) Prior Publication Data

US 2007/0140194 A1    Jun. 21, 2007

Related U.S. Application Data

(60) Provisional application No. 60/750,809, filed on Dec. 16, 2005.

(30) Foreign Application Priority Data

Jun. 5, 2006    (KR) .................. 10-2006-0050539

(51) Int. Cl.
*H04J 3/24* (2006.01)
(52) U.S. Cl. ........ 370/349; 370/328; 370/338; 370/339; 455/455
(58) Field of Classification Search .............. 370/328, 370/338
See application file for complete search history.

(56) References Cited

U.S. PATENT DOCUMENTS

| 6,240,414 B1 | 5/2001 | Beizer et al. |
| 6,810,269 B1 | 10/2004 | Aramaki |
| 2004/0114619 A1 | 6/2004 | Park et al. |
| 2005/0090264 A1 | 4/2005 | Kim |

FOREIGN PATENT DOCUMENTS

| EP | 1261174 A1 | 11/2002 |
| JP | 2001069151 A | 3/2001 |
| KR | 1020050040220 A | 5/2005 |
| WO | 01/24452 A1 | 4/2001 |
| WO | 2005/015751 A1 | 2/2005 |

OTHER PUBLICATIONS

Sinem Coleri Ergen, "ZigBee/IEEE 802.15.4 Summary," Sep. 10, 2004, Berkely University.*
Montenegro, "Transmission of IPv6 Packets over IEEE 802.15.4 Networks, draft-ietf-6lowpan-format-01," Oct. 24, 2005, IETF.*
Silicon Laboratories, "2.4 GHz zigbee network application interface programmer's guide," Sep. 2005, Silicon Laboratories Rev. 0.1.*

\* cited by examiner

*Primary Examiner* — Daniel J Ryman
*Assistant Examiner* — Jae Y Lee
(74) *Attorney, Agent, or Firm* — Sughrue Mion, PLLC

(57) ABSTRACT

A method of detecting and solving a network ID conflict is provided. The method of detecting and solving a network ID conflict includes generating and transmitting a personal area network identifier (PAN ID) report command frame that includes an extended PAN ID, and receiving a PAN ID update command frame in response to the transmitted PAN ID report command frame. According to the method, the PAN ID report command and the PAN ID update command are generated and provided by providing an extended PAN ID (EPID), and thus a network ID conflict can be detected and a new PAN ID is provided to solve the network ID conflict.

26 Claims, 10 Drawing Sheets

FIG. 4

| Octets:1 | 8 | 1 | Variable |
|---|---|---|---|
| | | Bits:0 / 1-4 / 5-7 | |
| Command frame identifier | EPID | PAN ID info / Length of Neighbor PAN ID LIST / Reserved | Neighbor PAN ID list |
| | | PAN ID info | |

NWK payload

PAN ID Report Command Frame Format

FIG. 6

| Octets:1 | 8 | 2 | 2 |
|---|---|---|---|
| Command frame identifier | EPID | Old PAN ID | New PAN ID |
| NWK payload ||||

PAN ID update command frame

FIG. 10A

| Octets:1 |
|---|
| Command frame identifier |
| NWK payload |

EPID request command frame

FIG. 10B

| Octets:1 | 8 |
|---|---|
| Command frame identifier | EPID |
| NWK payload ||

EPID response command frame

METHOD OF DETECTING AND SOLVING NETWORK ID CONFLICT

This application claims priority from U.S. Provisional Patent Application No. 60/750,809, which was filed on Dec. 16, 2005, in the U.S. patent and Trademark Office, and from Korean Patent Application No. 10-2006-0050539, which was filed on Jun. 5, 2006 in the Korean Intellectual Property Office, the disclosures of which are incorporated herein by reference in their entirety.

BACKGROUND OF THE INVENTION

1. Field of the Invention

Methods consistent with the present invention relate to detecting and solving a network ID conflict, and more particularly, to detecting and solving a network ID conflict that can solve the network ID conflict by generating and providing a network ID related command by providing an extended network ID in a wireless network system.

2. Description of the Related Art

A personal area network (PAN), in contrast to a well-known local area network (LAN) or a wide area network (WAN), means, for example, a network owned by a person for personal use. In other words, the PAN is a network constituted by devices owned by a person for the purpose of providing convenience to the person.

Such a PAN, as described above, selects a PAN identifier (PAN ID) on the basis of local network information. In such a case, two or more different PANs may select the same PAN ID.

FIG. 1 is a view explaining a network ID conflict occurring in the related art when two different PAN networks use the same PAN ID.

Referring to FIG. 1, when a new node intends to access a network 1 in a state that both network 1 and network 2 have the same PAN ID, the new node that desires to access network 1 may undesirably access network 2, instead of accessing network 1. Even if the new node has accessed the desired network 1 without fail, the new node may nevertheless wrongly transmit a packet to network 2 because both network 1 and network 2 have the same PAN ID.

FIG. 2 is a view explaining a network ID conflict occurring in the related art when two different networks have the same PAN ID and the same node address.

Referring to FIG. 2, when a node B that is a member of network 1 transmits a packet to node C, node A also receives the packet transmitted from node B. That is, because both network 1 and network 2, to which node A and node B belong, respectively, have the same PAN ID and the same node address, node A receives and processes the packet from node B.

As described above, a node, which belongs to a different network, and which is not the intended destination of a transmitted packet, receives and processes the packet due to the network ID conflict, and this causes network overhead to be increased.

SUMMARY OF THE INVENTION

An aspect of the present invention provides a method of detecting and solving a network ID conflict that can monitor a network state and manage a network efficiently by generating and providing a network ID related command by providing an extended network ID.

An aspect of the present invention provides a method of detecting and solving a network identifier (ID) conflict, which includes generating and transmitting a personal area network identifier (PAN ID) report command frame that includes an extended PAN ID, and receiving a PAN ID update command frame in response to the transmitted PAN ID report command frame.

The PAN ID report command frame may include at least one of a command frame ID, an extended PAN ID (EPID), PAN ID information, and a neighboring PAN ID list. Further, the PAN ID information may include at least one of a PAN ID conflict flag, the number of neighboring PAN ID list, and a reserved region.

The EPID can be allocated, for instance, using a 64-bit extended MAC address, a PAN security key, or a specified name set by a user.

The PAN ID update command frame may include at least one of a command frame ID, an EPID, an old PAN ID, and a new PAN ID.

The method of detecting and solving a network ID conflict according to exemplary embodiments of the present invention may further include scanning beacon frames from PANs in order to access a network intended to be accessed, and judging whether one or more neighboring networks exist for the network intended to be accessed on the basis of the beacon frames.

If one or more neighboring networks exist for the network intended to be accessed as a result of judgment, the transmission operation generates and transmits the PAN ID report command frame. Also, the transmission operation can transmit the PAN ID report command frame to a coordinator of the network.

The transmission operation may include a PAN ID conflict search operation of searching whether networks using the same PAN ID exist. The transmission operation may transmit the PAN ID report command frame by setting a different PAN ID conflict flag, in accordance with the result of conflict search in the searching operation.

Further, the transmission operation may retransmit the PAN ID report command frame to the coordinator if the PAN ID update command frame is not received when a preset PAN ID update interval elapses after the transmission of the PAN ID report command frame.

The extended PAN ID may be added to a payload of the beacon frame.

An exemplary method of detecting and solving a network ID conflict may further include allocating the extended PAN ID (EPID), and the EPID can be allocated before or when the node that intends to access the network accesses the network.

An exemplary method of detecting and solving a network ID conflict may further include broadcasting an extended PAN ID request command frame to request the extended PAN ID (EPID) allocated to the network, and receiving an EPID response command frame including the EPID in response to the EPID request command frame.

The receiving operation may include collecting EPIDs of the networks on the basis of the EPID response command frame, comparing the EPID of the currently accessed network with the EPID of the network intended to be accessed, and releasing the access to the current network and accessing the network intended to be accessed on the basis of the result of comparison.

The accessing operation may include releasing the access to the current network and accessing the network intended to be accessed on the basis of the EPID collected in the collecting operation if the EPID of the current network is not the EPID of the network intended to be accessed.

An exemplary method of detecting and solving a network ID conflict may further include judging whether one or more neighboring networks exist in the neighborhood of the network, wherein if the neighboring networks exist as a result of judgment, the transmission operation generates and transmits the PAN ID report command frame to the coordinator of the network.

In another aspect of the present invention, there is provided a method of detecting and solving a network identifier (ID) conflict, which includes receiving a personal area network identifier (PAN ID) report command frame that includes an extended PAN ID, and generating and transmitting a PAN ID update command frame for the received PAN ID report command frame.

The PAN ID report command frame may include at least one of a command frame ID, an extended PAN ID (EPID), PAN ID information, and a neighboring PAN ID list. Moreover, the PAN ID information may include at least one of a PAN ID conflict flag, the number of neighboring PAN ID list, and a reserved region.

The EPID can be allocated using a 64-bit extended MAC address, and the EPID can be allocated using a PAN security key or a specified name set by a user.

The PAN ID update command frame may include at least one of a command frame ID, an EPID, an old PAN ID, and a new PAN ID.

An exemplary method of detecting and solving a network ID collision may further include adding PAN IDs of the neighboring PAN ID list included in the PAN ID report command frame to a PAN ID blacklist that manages the PAN IDs allocated to the neighboring networks, and selecting a new PAN ID if the PAN ID conflict flag included in the PAN ID report command frame is set to a PAN ID conflict, wherein the transmission operation generates the PAN ID update command frame including the new PAN ID selected in the selection operation and then broadcasts the generated PAN ID update command frame.

The PAN ID blacklist may be managed by a coordinator of the network, and the selection operation can select one of PAN IDs except for the PAN IDs included in the PAN ID blacklist as the new PAN ID.

An exemplary method of detecting and solving a network ID conflict may further include changing the PAN ID from the old PAN ID to the new PAN ID when a preset network broadcast delivery time elapses after the broadcasting of the PAN ID report command frame.

An exemplary method of detecting and solving a network ID conflict may further include receiving the EPID request command frame requesting the EPID allocated to the network, and transmitting the EPID response command frame including the EPID in response to the EPID request command frame.

An exemplary method of detecting and solving a network ID conflict may further include adding PAN IDs of the neighboring PAN ID list included in the PAN ID report command frame to a PAN ID blacklist that manages the PAN IDs allocated to the neighboring networks, wherein the PAN ID blacklist can be managed in a plurality of nodes.

BRIEF DESCRIPTION OF THE DRAWINGS

The aspects of the present invention will be more apparent by describing certain exemplary embodiments of the present invention with reference to the accompanying drawings, in which:

FIG. 4 is a view illustrating an example of a PAN ID report command frame according to an exemplary embodiment of the present invention;

FIG. 6 is a view illustrating an example of a PAN ID update command frame according to an exemplary embodiment of the present invention;

FIGS. 10A and 10B are views illustrating the structures of an EPID request command frame and an EPID response command frame according to an exemplary embodiment of the present invention.

DETAILED DESCRIPTION OF EXEMPLARY EMBODIMENTS OF THE PRESENT INVENTION

Figure 1:
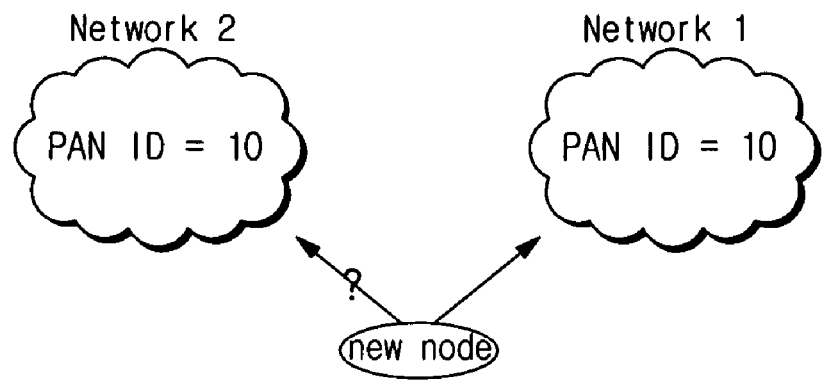
FIG. 1 is a view explaining a network ID conflict occurring in the related art when two different PAN networks use the same PAN ID.
Figure 2:
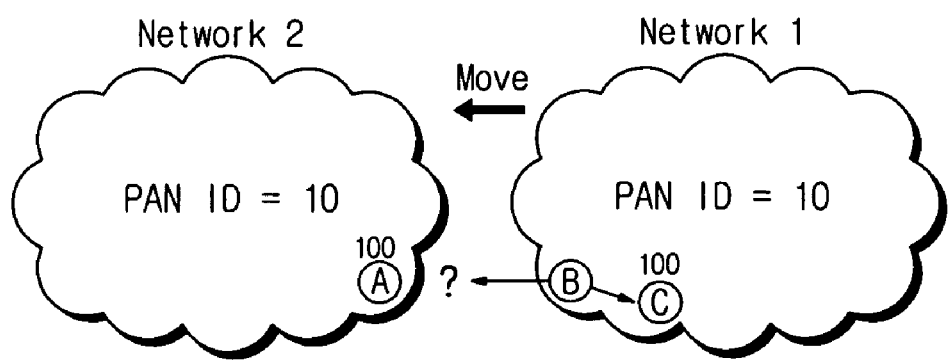
FIG. 2 is a view explaining a network ID conflict occurring in the related art when two different networks have the same PAN ID and the same node address.

Certain exemplary embodiments of the present invention will be described in greater detail below with reference to the accompanying drawings.

In the following description, the same drawing reference numerals are used for the same elements even in different drawings. The matters defined in the description such as a detailed construction and elements are nothing but examples provided to assist one of ordinary skill in a comprehensive understanding of the present invention. Thus, it is apparent that the present invention can be carried out with or without those defined examples. Also, well-known functions or constructions are not described in detail since they would obscure the invention in unnecessary detail.

Figure 3:
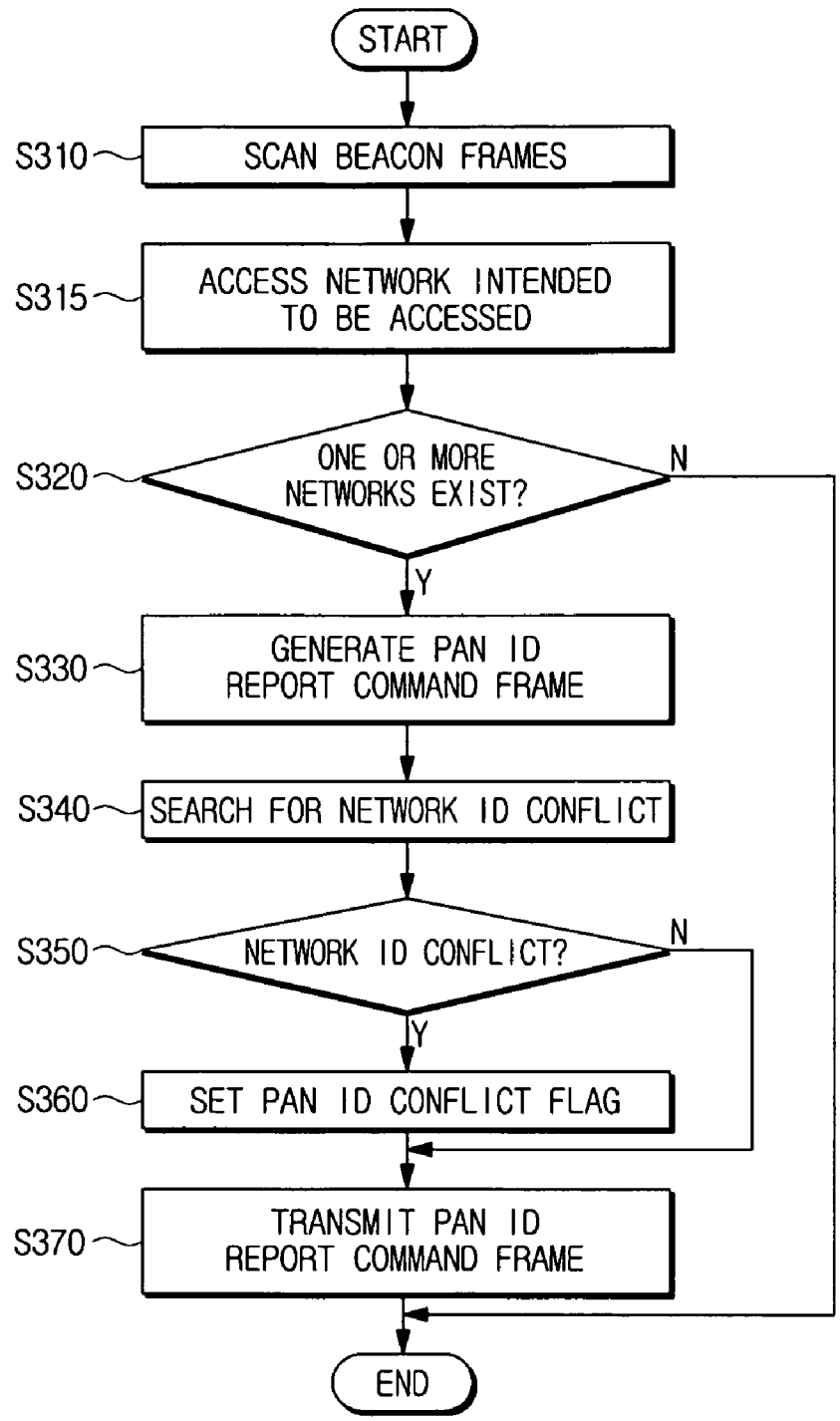
FIG. 3 is a flowchart illustrating a method of generating a PAN ID report command frame when a new node intends to access a network according to an exemplary embodiment of the present invention.

FIG. 3 is a flowchart illustrating a method of generating a PAN ID report command frame when a new node intends to access a network according to an exemplary embodiment of the present invention, and FIG. 4 is a view illustrating an example of a PAN ID report command frame according to an exemplary embodiment of the present invention.

Referring to FIGS. 3 and 4, a new node that intends to access a network scans beacon frames from neighboring networks in operation (S310). In this example, the new node collects personal area network identifiers (PAN IDs) and extended PAN IDs (EPIDs) of the neighboring networks of the network intended to be accessed by scanning the beacon frames.

Then, the new node negotiates with and accesses the network intended to be accessed in operation (S315).

The new node then judges whether one or more networks exists in the neighborhood of the network (S320). That is, the new node judges the number of networks existing in the neighborhood of the accessed network by scanning the beacon frames received from the neighboring networks in operation S310.

If one or more networks exist, the new node generates a PAN ID report command frame operation (S330).

Specifically, referring to FIG. 4, the new node generates a PAN ID report command frame that includes, for instance, a command frame ID, an EPID of the accessed network, PAN ID information, and a neighboring PAN ID list of the neighboring networks of the accessed network. According to the example shown in FIG. 4, the PAN ID information may include a PAN ID conflict flag, a length of a neighboring PAN ID list, and a reserved region.

The neighboring PAN ID list includes, for example, PAN IDs of the neighboring networks gathered on the basis of the beacon frames of the neighboring networks that the new node has received.

Referring to FIG. 3, the new node then searches for whether a network ID conflict occurs in operation (S340). That is, the new node searches whether any networks that use different EPIDs and any of the same PAN IDs exist.

If, as a result of the search, it is determined that a network ID conflict has occurred, then the new node sets a PAN ID conflict flag in operation (S360).

Specifically, if a network that uses a same PAN ID as the network that has been accessed by the new node is found in operation (S340), the new node judges that a network ID conflict has occurred, and sets the PAN ID conflict flag. For example, if a network ID conflict has occurred, the new node sets the PAN ID conflict flag to "1," while if no network ID conflict has occurred, the new node sets the PAN ID conflict flag to "0."

Then, the new node transmits the generated PAN ID report command frame to a coordinator of the network that the node has accessed in operation (S370). The coordinator, for example, allocates node addresses to nodes constituting the network, and manages the whole operation of the network.

Figure 5:
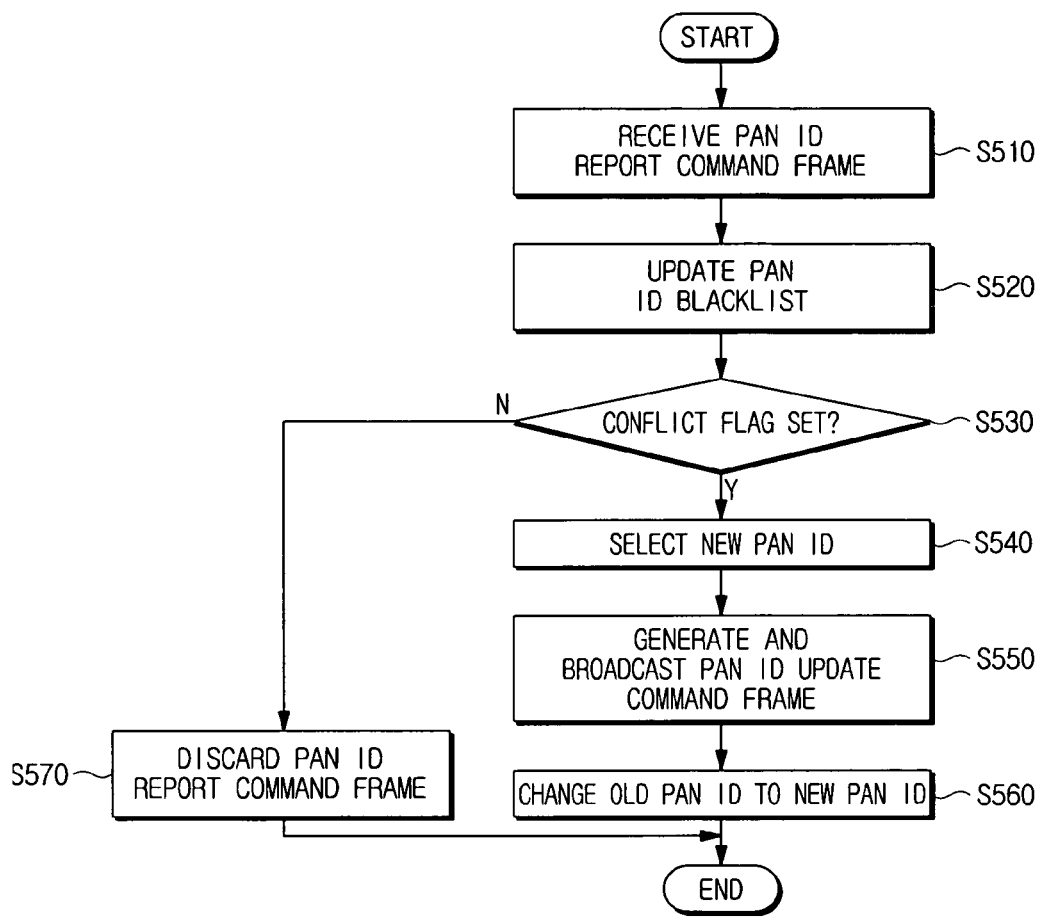
FIG. 5 is a flowchart illustrating a method of generating a PAN ID update command frame when a new node intends to access a network according to an exemplary embodiment of the present invention.

FIG. 5 is a flowchart illustrating a method of generating a PAN ID update command frame when a new node intends to access a network according to an exemplary embodiment of the present invention, and FIG. 6 is a view illustrating an example of a PAN ID update command frame according to an exemplary embodiment of the present invention.

Referring to FIGS. 5 and 6, the coordinator receives a PAN ID report command frame in operation (S510).

Then, the coordinator updates a PAN ID blacklist on the basis of the contents included in the PAN ID report command frame in operation (S520).

That is, the coordinator adds the PAN IDs that are included in the neighboring PAN ID list to its own PAN ID blacklist on the basis of the neighboring PAN ID list included in the received PAN ID report command frame.

Then, the coordinator judges whether the PAN ID conflict flag is set based on the PAN ID report command frame in operation (S530).

Specifically, the coordinator judges whether any network using a same PAN ID as its own network exists by judging whether the PAN ID conflict flag is set. According to the exemplary embodiment shown in FIG. 5, the coordinator judges whether the PAN ID conflict flag is set to "1" or "0." If the PAN ID conflict flag is set, the coordinator judges that a network using a same PAN ID as its own network exists, and selects a new PAN ID in operation (S540).

More specifically, if the coordinator judges that the PAN ID conflict flag is set to "1" in operation (S530), the coordinator judges that a network using a same PAN ID as its own network exists. And in such a case, the coordinator selects one of the PAN IDs except for the PAN IDs included in the PAN ID blacklist, which was updated in operation (S520), as a new PAN ID.

Then, the coordinator generates a PAN ID update command frame, and broadcasts the generated PAN ID update command frame in operation (S550).

Referring to FIG. 6, the coordinator generates the PAN ID update command frame that includes a command frame ID, an EPID of the network to which the coordinator itself belongs, an old PAN ID that is the existing PAN ID, and a new PAN ID, and then broadcasts the generated PAN ID update command frame.

Referring to FIG. 5, if a network broadcast delivery time elapses, then the coordinator changes the PAN ID from the old PAN ID to the new PAN ID in operation (S560). Specifically, if the preset network broadcast delivery time elapses after the PAN ID update command frame is broadcast in operation (S550), then the coordinator changes the PAN ID from the old PAN ID to the new PAN ID. According to the exemplary embodiment shown in FIG. 5, the network broadcast delivery time is a preset time during which the nodes belonging to the network that uses the old PAN ID can receive and process the PAN ID update command frame.

Meanwhile, if the PAN ID conflict flag is judged to be set to "0" in operation S530, then the coordinator discards the PAN ID report command frame in operation (S570).

In operation (S510), a router, rather than the coordinator, can receive the PAN ID report command frame. In such a case, if the PAN IDs that are included in the neighboring PAN ID list are all included in a neighboring node management table that manages information on neighboring nodes in the neighborhood of the router, when the router receives the PAN ID report command frame, then the router discards the received PAN ID report command frame.

Also, if the PAN IDs included in the neighboring PAN ID list have been recorded in the router, the router discards the received PAN ID report command frame. In other words, if the router has received the PAN ID report command frame transmitted from other nodes more than twice, then the router discards the received PAN ID report command frame.

In the method of generating a PAN ID report command frame and a PAN ID update command frame according to exemplary embodiments of the present invention, the new node retransmits the PAN ID report command frame to the coordinator if the PAN ID update command frame is not received when the PAN ID update interval elapses after the transmission of the PAN ID report command frame having the set PAN ID conflict flag.

Figure 7:
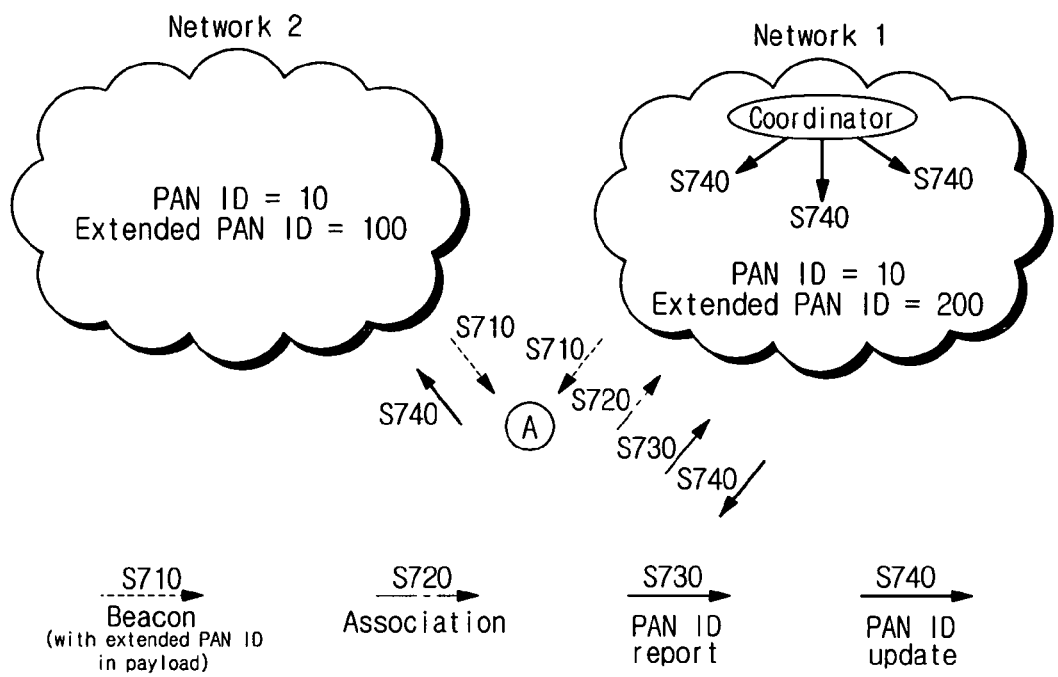
FIG. 7 is a view explaining a method of detecting and solving a network ID conflict using commands generated as illustrated in FIGS. 3 and 5 according to an exemplary embodiment of the present invention.

FIG. 7 is a view explaining a method of detecting and solving a network ID conflict using commands generated as illustrated in FIGS. 3 and 5 according to an exemplary embodiment of the present invention.

Referring to FIG. 7, node A, that desires to access network 1, receives a beacon frame from neighboring network 1 and neighboring network 2 in operation (S710).

Then, node A negotiates with network 1, that is intended to be accessed, and when the negotiation is completed, node A becomes a member of network 1 in operation (S720).

Then, if one or more networks are detected in the neighborhood of network 1, which is accessed on the basis of a received beacon frame, node A generates a PAN ID report command frame, and transmits the generated PAN ID report command frame to the coordinator of node A itself in operation (S730).

According to the exemplary embodiment shown in FIG. 7, since network 1 and network 2 use the same PAN ID "10", a PAN ID report command frame, in which the PAN ID conflict flag is set to "1," is transmitted by node A.

Then, the coordinator of network 1 updates the PAN ID blacklist on the basis of the received PAN ID report command frame, and if the PAN ID conflict flag has been set to "1," the coordinator generates and broadcasts the PAN ID update command frame in operation (S740).

Figure 8A:
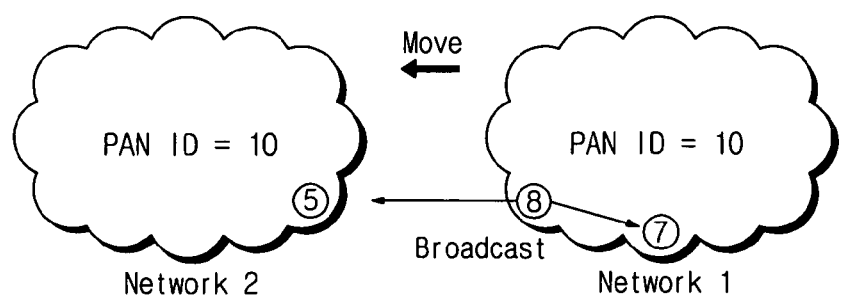
FIGS. 8A, 8B and 8C are views provided to explain a method of detecting and solving a network ID conflict occurring due to the mobility of a network according to an exemplary embodiment of the present invention.
Figure 8B:
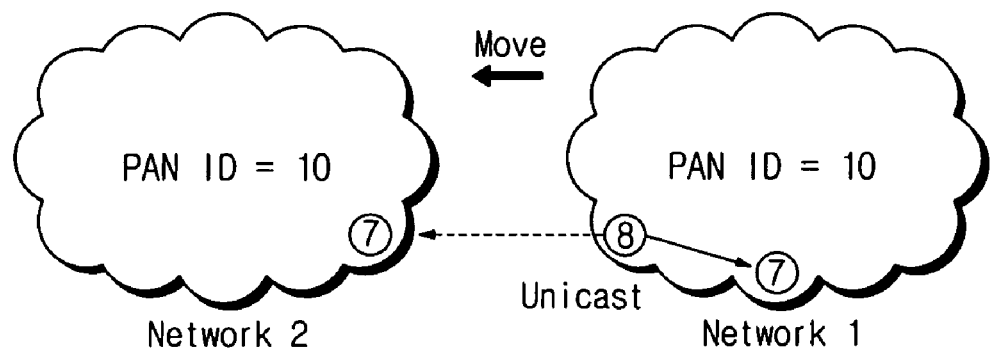
Figure 8C:
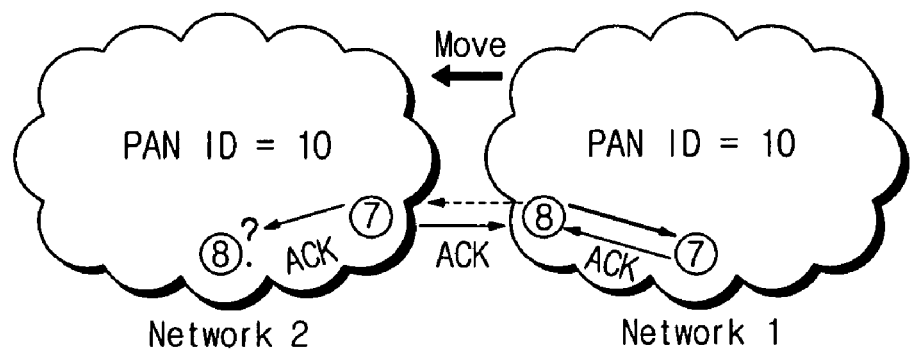

FIGS. 8A, 8B and 8C are views provided to explain a method of detecting and solving a network ID conflict occurring due to the mobility of a network according to an exemplary embodiment of the present invention.

FIG. 8A shows a case where a boundary node broadcasts a packet. Referring to FIG. 8A, if boundary node 8, which is located at the boundary of network 1, broadcasts a packet to network 1 when the node 8 moves and reaches the communication range of boundary node 5 of network 2, then node 5 of network 2, in addition to nodes that constitute network 1, receives the packet. According to the exemplary embodiment shown in FIG. 8A, the node 5 checks the EPID of the packet transmitter (i.e., node 8) by scanning the received beacon frame, if the packet transmitter (i.e., node 8) is not included in a neighboring node management table of the node 5.

Accordingly, node 5 discards the aforementioned packet broadcast from the transmitter (i.e., node 8) without processing the packet. Also, as described above, node 5 can generate and transmit a PAN ID report command frame to a coordinator (not illustrated) of network 2, and the coordinator of network 2 can generate and broadcast a PAN ID update command frame.

FIG. 8B shows a case where a boundary node unicasts a packet. Referring to FIG. 8B, node 8, which is a member of network 1, unicasts a packet to node 7, that is a member of network 1. Here, since node 7 of network 1 and node 7 of network 2 use the same node address (i.e., 7) and have the same PAN ID (i.e., PAN ID=10), both the node 7 of network 1 and the node 7 of network 2 receive the packet unicast from node 8.

In such a case, the node 7 of network 2 confirms that the node 8 of network 1 is not included in its own neighboring node management table, and then checks the EPID of node 8 by scanning the beacon frame. As a result of such checking, the node 7 of network 2 discards the packet from node 8 without processing it. Also, as described above, node 7 of network 2 can generate and transmit a PAN ID report command frame to a coordinator (not illustrated) of network 2, and the coordinator of network 2 can generate and broadcast a PAN ID update command frame.

FIG. 8C shows a case where a boundary node receives a wrongly transmitted acknowledgement (ACK). Referring to FIG. 8C, if node 8 of network 1 unicasts a packet to node 7 of network 1, then node 8 receives an acknowledgement (ACK) from node 7 of network 1 that is a response to the unicasted packet.

In this case, since node 7 of network 1 and node 7 of network 2 use the same node address (i.e., 7) and have the same PAN ID (i.e., PAN ID=10), node 7 of network 2 also receives the packet from node 8 of network 1, and transmits an ACK to node 8 in response to the received packet.

In such a case, since the node 8 of network 1 and node 8 of network 2 have the same PAN ID and the same node address, they both receive the ACK from node 7 of network 2. At such a time, node 8 of network 1 confirms duplicate reception of the ACK, and scans the beacon frame from the neighboring network in order to detect whether a network ID conflict occurs. The subsequent processes are analogous to the processes of generating the PAN ID report command frame and the PAN ID update command frame as illustrated in FIGS. 3 and 5 and, accordingly, the detailed explanation thereof has been omitted.

Since node 8 of network 2 receives the ACK from node 7 of network 2, wherein the received ACK is a response to a packet which the node 8 did not transmit, the node 8 scans the beacon frame from the neighboring network in order to detect whether a network ID conflict occurs. The subsequent processes are analogous to those of node 8 of network 1. In this case, node 8 of network 2 may transmit a request message for checking whether the network ID conflict occurs due to node 7 of network 1 having transmitted the ACK.

In an exemplary embodiment of the present invention, it is preferable, but not necessary, that an extended PAN ID (EPID), which has been allocated to each network, is added to the payload of a beacon frame. The EPID can be allocated using a 64-bit extended MAC address, a PAN security key, or a specified name set by a user.

In the method of detecting and solving a network ID conflict according to an exemplary embodiment of the present invention, the coordinator can detect whether a network ID conflict occurs by periodically receiving and scanning beacon frames from neighboring networks.

Also, in the method of detecting and solving a network ID conflict according to an exemplary embodiment of the present invention, if a node recognizes the beacon frame received by the neighboring node, the node can update its neighboring node management table, and can check whether a network ID conflict occurs.

A method of detecting and solving a network ID conflict according to an exemplary embodiment of the present invention, in which the PAN ID report command frame and the PAN ID update command frame are added to a payload of a beacon frame to be transmitted, has been explained above.

Hereinafter, a method of detecting and solving a network ID conflict according to another exemplary embodiment of the present invention will be explained with reference to FIGS. 9, 10A and 10B.

Figure 9:
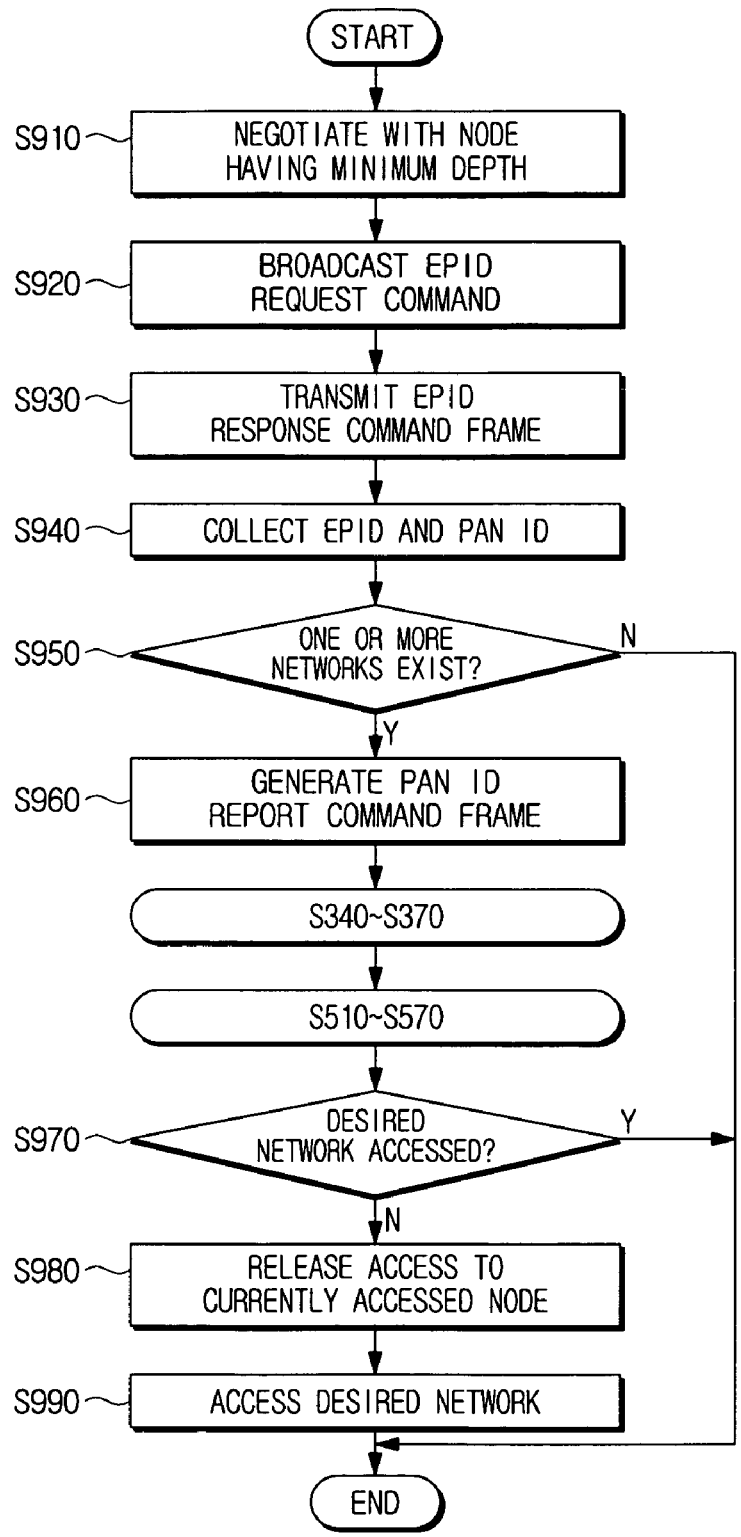
FIG. 9 is a flowchart illustrating a method of detecting and solving a network ID conflict according to an exemplary embodiment of the present invention.

FIG. 9 is a flowchart illustrating a method of detecting and solving a network ID conflict according to an exemplary embodiment of the present invention.

Referring to FIG. 9, a new node that intends to access a network selects a node having a minimum depth with respect to the new node, from among its neighboring nodes, as a parent node, and negotiates with the selected parent node in operation (S910). According to the exemplary embodiment shown in FIG. 9, the new node then detects the existence of a network, which uses a same PAN ID as the network that the new node has accessed, by scanning beacon frames.

Then, the new node broadcasts an EPID request command frame to its neighboring nodes in operation (S920).

That is, referring to FIG. 10A, the new node broadcasts the EPID request command frame that includes a command frame identifier (ID) to the neighboring nodes.

The nodes having received the EPID request command frame transmit an EPID response command frame to the new node in operation (S930). Referring to FIG. 10B, the nodes having received the EPID request command frame transmit to the new node an EPID response command frame that includes an EPID and a command frame identifier of the network, to which the respective nodes belong.

Then, the new node collects the received EPIDs and PAN IDs of the neighboring nodes on the basis of the EPID response command frames received from the neighboring nodes in operation (S940). At this time, the new node collects the PAN IDs of the neighboring nodes by scanning the beacon frames.

Then, the new node judges whether one or more networks exist in the neighborhood of the network that the new node is currently accessing, on the basis of the collected PAN IDs in operation (S950).

If one or more networks exist, the new node generates a PAN ID report command frame and transmits the generated PAN ID report command frame to its coordinator in operation (S960).

The subsequent processes are analogous to those in operations S340 to S370 as described above with reference to FIG. 3 and, accordingly, the detailed explanation thereof has been omitted. If the new node detects a neighboring network that uses a same PAN ID as the network to which the new node belongs, the new node sets the PAN ID conflict flag to "1," and transmits the PAN ID report command frame to the coordinator.

The processes of receiving the PAN ID report command frame and generating the PAN ID update command frame, which are performed by the coordinator, are analogous to those in operations S510 to S570 as discussed above with respect to FIG. 5, accordingly, the detailed explanation thereof has been omitted.

Then, the new node receives the EPID update command frame, updates the PAN ID, and then judges whether the new node has accessed the network intended to be accessed in operation (S970).

Specifically, the new node compares the EPID of the network intended to be accessed with the EPID of the currently accessed parent node, on the basis of the EPIDs of the neighboring nodes collected in operation S940. If the EPID of the network intended to be accessed is judged to be different from the EPID of the parent node as a result of comparison, the new node releases the access to the parent node in operation (S980).

Then, the new node directly accesses the network intended to be accessed on the basis of the EPIDs of the collected neighboring networks in operation (S990). In this case, the new node selects a node having a minimum depth with respect to the new node among members of the network intended to be accessed, as a parent node, and negotiates with the selected parent node.

In a method of detecting and solving a network ID conflict according to another exemplary embodiment of the present invention, the new node may access one of the other nodes selected from among the nodes transmitting the EPID response command frame, if the EPID of the network intended to be accessed, among the EPIDs of the neighboring networks collected in operation S990. In this case, the new node selects a node having a minimum depth with respect to the new node, as a parent node.

Additionally, in another exemplary embodiment of the present invention, the method of detecting and solving a network ID conflict in consideration of the mobility of a network detects whether the network ID conflict occurs using the EPID request command frame, instead of using the exemplary embodiment of the present invention discussed above.

For instance, the EPID request command frame can be transmitted to a new node which intends to access the network and a new neighboring node found due to the network mobility. In such a case, the EPID request command frame can be periodically transmitted to search whether a network ID conflict occurs. Except for the point that the EPID request command frame is used instead of the beacon frame, the method of detecting and solving a network ID conflict according to the mobility of a network is analogous to that as illustrated in FIGS. 8A, 8B and 8C and, accordingly, the detailed explanation thereof has been omitted.

The method of detecting and solving a network ID conflict using the EPID request command frame and the EPID response command frame according to another exemplary embodiment of the present invention has been explained above.

Hereinafter, a method of detecting and solving a network ID conflict according to still another exemplary embodiment of the present invention will be explained with reference to FIG. 11.

Figure 11:
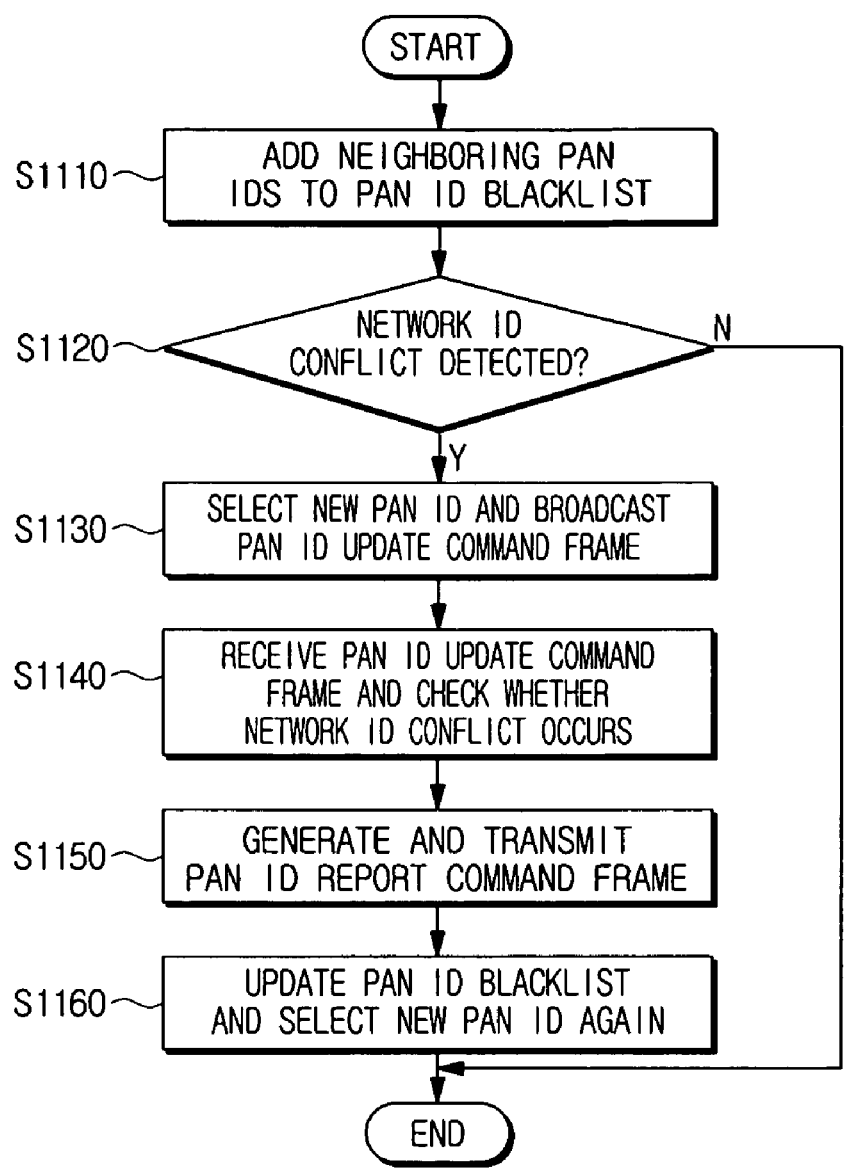
FIG. 11 is a flowchart illustrating a method of detecting and solving a network ID conflict according to another exemplary embodiment of the present invention.

FIG. 11 is a flowchart illustrating a method of detecting and solving a network ID conflict according to another exemplary embodiment of the present invention.

Referring to FIG. 11, a node adds PAN IDs of neighboring networks to its own PAN ID blacklist by scanning beacon frames in operation (S1110).

Then, the node detects whether a network ID conflict occurs in a network to which the node belongs in operation (S1120). That is, the node detects the existence or nonexistence of networks using a same PAN ID as the network to which the node itself belongs.

If a network ID conflict is detected, the node selects a new PAN ID, and broadcasts the PAN ID update command frame in operation (S1130).

Specifically, if the node detects a network ID conflict, it selects a PAN ID that is different from the PAN IDs included in its own PAN ID blacklist. The node then broadcasts the PAN ID update command frame, which includes the selected new PAN ID.

The nodes that have received the PAN ID update command frame then check whether the new PAN ID conflicts with the PAN ID of its neighboring network in operation (S1140).

Then, if a network ID conflict occurs, the node having received the PAN ID update command frame generates the PAN ID report command frame, and transmits the generated PAN ID report command frame to the node having transmitted the PAN ID update command frame in operation (S1150).

The node having received the PAN ID report command frame then updates its own PAN ID blacklist, selects a new PAN ID again, and then broadcasts a new PAN ID update command frame in operation (S1160). The new PAN ID selected in operation S1160 is a new PAN ID that is different from the PAN IDs included in the PAN ID blacklist.

As described above, according to exemplary embodiments of the present invention, a PAN ID report command and a PAN ID update command are generated and provided by providing an extended PAN ID (EPID), and thus a network ID conflict can be detected and a new PAN ID is provided to solve the network ID conflict.

In addition, according to exemplary embodiments of the present invention, with the use of EPID request command frames and EPID response command frames, the network ID conflict can be effectively solved.

In addition, according to exemplary embodiments of the present invention, each node monitors and manages the network state by managing a PAN ID blacklist, and thus an efficient network operation becomes possible without any specified node having a central control function.

The foregoing exemplary embodiments are merely illustrative and are not to be construed as limiting the present invention. The present teachings can be readily applied to other types of apparatuses. Also, the above description of the exemplary embodiments of the present invention is intended to be illustrative, and not to limit the scope of the claims, and many alternatives, modifications, and variations will be apparent to those skilled in the art.

What is claimed is:

1. A method of detecting and solving a network identifier (ID) conflict by a first device that sends frames to and receives frames from a second device in a first personal area network (PAN) and that is able to receive signals from a second neighboring personal area network (PAN) among one or more neighboring personal area networks (PANs), the method comprising:
   generating and transmitting a personal area network identifier (PAN ID) report command frame that comprises an extended PAN ID (EPID); and
   receiving a PAN ID update command frame in response to the transmitted PAN ID report command frame,
   wherein the PAN ID report command frame comprises a PAN ID conflict flag,
   wherein in the generating and transmitting, if a neighboring PAN, among the one or more neighboring PANs, using a different EPID but a same PAN ID exists, the PAN ID conflict flag is set by the first device to indicate that a PAN ID conflict has been searched by the first device and the PAN ID report command frame is generated.

2. The method as claimed in claim 1, wherein the PAN ID report command frame comprises at least one of: a command frame ID, an extended PAN ID (EPID), PAN ID information, and a neighboring PAN ID list.

3. The method as claimed in claim 2, wherein the PAN ID report command frame comprises the PAN ID information; and
   wherein the PAN ID information comprises at least one of: the PAN ID conflict flag, a number indicating a length of the neighboring PAN ID list, and a reserved region.

4. The method as claimed in claim 1, wherein the EPID comprises a 64-bit extended MAC address.

5. The method as claimed in claim 1, wherein the EPID comprises at least one of a PAN security key or a specified name set by a user.

6. The method as claimed in claim 1, wherein the PAN ID update command frame comprises at least one of: a command frame ID, an EPID, an old PAN ID, and a new PAN ID.

7. The method as claimed in claim 1, further comprising:
   scanning beacon frames from the one or more neighboring PANs; and
   determining whether the one or more neighboring PANs exist with respect to the first PAN intended to be accessed on the basis of the scanned beacon frames;
   wherein if it is determined that the one or more neighboring PANs exist, then the PAN ID report command frame is generated and transmitted.

8. The method as claimed in claim 1, wherein the PAN ID report command frame is transmitted to a coordinator of the first PAN.

9. The method as claimed in claim 1, further comprising retransmitting the PAN ID report command frame to a network coordinator of the first PAN if the PAN ID update command frame is not received when a preset PAN ID update interval elapses after the PAN ID report command frame is transmitted.

10. The method as claimed in claim 1, wherein the extended PAN ID is added to a payload of a beacon frame.

11. The method as claimed in claim 1, further comprising allocating the extended PAN ID (EPID);
   wherein the EPID is allocated before or at a time when the first device accesses the first PAN.

12. The method as claimed in claim 1, further comprising:
   after accessing the first PAN by the first device, broadcasting an extended PAN ID request command frame to request an extended PAN ID (EPID) that is allocated to each of the one or more neighboring PANs; and
   receiving an EPID response command frame, which comprises an EPID, in response to the broadcasted EPID request command frame.

13. The method as claimed in claim 12, further comprising:
   collecting EPIDs of the one or more neighboring PANs based on the EPID response command frame;
   comparing an EPID of the first PAN with an EPID of a neighboring PAN intended to be accessed by the first device; and
   releasing access to the first PAN and accessing the neighboring PAN intended to be accessed based on the result of the comparison.

14. The method as claimed in claim 13, further comprising releasing access to the first PAN and accessing the neighboring PAN intended to be accessed based on the result of the comparison only if the EPID of the first PAN is not equal to the EPID of the neighboring PAN intended to be accessed.

15. The method as claimed in claim 12, further comprising determining whether the one or more neighboring PANs exist with respect to the first PAN; and
   transmitting the PAN ID report command to a coordinator of the first PAN if it is determined that any neighboring PANs exist.

16. A method of detecting and solving a network identifier (ID) conflict by a first device that sends frames to and receives frames from a second device in a first personal area network (PAN) and that is able to receive signals from a second neighboring PAN among one or more neighboring personal area networks (PANs), the method comprising:
   receiving a personal area network identifier (PAN ID) report command frame that comprises an extended PAN ID (EPID); and
   generating and transmitting a PAN ID update command frame in response to the received PAN ID report command frame,
   wherein the PAN ID report command frame comprises a PAN ID conflict flag,
   wherein the PAN ID conflict flag is set to indicate that a PAN ID conflict has been searched if it is determined by the first device that a neighboring PAN, among the one or more neighboring PANs, using a different EPID but a same PAN ID exists.

17. The method as claimed in claim 16, wherein the PAN ID report command frame comprises at least one of: a command frame ID, an extended PAN ID (EPID), PAN ID information, and a neighboring PAN ID list.

18. The method as claimed in claim 17, wherein the PAN ID report command frame comprises the PAN ID information; and
   wherein the PAN ID information comprises at least one of: the PAN ID conflict flag, a number indicating a length of the neighboring PAN ID list, and a reserved region.

19. The method as claimed in claim 16, wherein the EPID comprises a 64-bit extended MAC address.

20. The method as claimed in claim 16, the EPID comprises at least one of a PAN security key and a specified name set by a user.

21. The method as claimed in claim 16, wherein the PAN ID update command frame comprises at least one of: a command frame ID, an EPID, an old PAN ID, and a new PAN ID.

22. The method as claimed in claim 16, further comprising:
adding PAN IDs of a neighboring PAN ID list, which is included in the PAN ID report command frame, to a PAN ID blacklist, the PAN IDs being allocated to the one or more neighboring PANs;
selecting a new PAN ID, if the PAN ID conflict flag included in the PAN ID report command frame indicates a PAN ID conflict;
generating the PAN ID update command frame so as to include the selected new PAN ID; and
broadcasting the generated PAN ID update command frame.

23. The method as claimed in claim 22, wherein the PAN ID blacklist is managed by a coordinator of the first PAN; wherein a new PAN ID is selected that is different from the PAN IDs included in the PAN ID blacklist.

24. The method as claimed in claim 22, further comprising changing a PAN ID to a new PAN ID if a preset network broadcast delivery time elapses after the broadcasting of the PAN ID update command frame.

25. The method as claimed in claim 16, further comprising:
receiving an EPID request command frame requesting an EPID that is allocated to each of the one or more neighboring PANs; and
transmitting an EPID response command frame, which comprises an EPID, in response to the EPID request command frame.

26. The method as claimed in claim 25, further comprising adding PAN IDs of a neighboring PAN ID list included in the PAN ID report command frame to a PAN ID blacklist that comprises the PAN IDs that are allocated to the one or more neighboring PANs, wherein the PAN ID blacklist is managed in a plurality of nodes.

* * * * *